Oct. 15, 1968  A. L. BARKER  3,406,232
PROCESS FOR MOLDING EYEGLASS FRAMES
Filed Aug. 3, 1964  2 Sheets-Sheet 1

INVENTOR.
ALLAN L. BARKER
BY J. Albert Hultquist
ATTORNEY

Oct. 15, 1968   A. L. BARKER   3,406,232

PROCESS FOR MOLDING EYEGLASS FRAMES

Filed Aug. 3, 1964   2 Sheets-Sheet 2

INVENTOR.
ALLAN L. BARKER
BY J. Albert Kvalquist
ATTORNEY

United States Patent Office 3,406,232
Patented Oct. 15, 1968

3,406,232
PROCESS FOR MOLDING EYEGLASS FRAMES
Allan L. Barker, Southbridge, Mass., assignor, by mesne assignments, to American Optical Corporation, a corporation of Delaware
Filed Aug. 3, 1964, Ser. No. 387,114
2 Claims. (Cl. 264—162)

ABSTRACT OF THE DISCLOSURE

A process for molding a closed internal groove or undercut in eyeglass frames to eventually receive a lens comprising the steps of placing a resilient member to form the groove within the cavity on the molding block to form the rim, molding the frame in such cavity, removing the molded frame from the cavity with the resilient member retained in said frame, polishing the frame, and thereafter removing the resilient member from the frame.

---

This invention relates generally to a process for manufacturing molded articles and a product obtained thereby, and more specifically to a process for molding a groove or undercut in a thermoplastic article and the product obtained by that process.

The process has been found to be useful for the molding of various articles, but most advantageous when used in molding lens grooves in eyeglass frames and producing thereby a finished, polished eyeglass frame. A problem in the formation of lens grooves in eyeglass frames has existed over a great span of time in the art of frame manufacturing and many methods have been employed for forming such grooves. For instance, many manufacturers have employed a rigid die lip to form the groove, which lip occupies the groove in the molded frame, and when the mold is opened, the die lip tends to prevent the ejection of the frame from the mold. The frame has to be forced over the die lip while it is still somewhat hot and plastic, as otherwise the frame might be broken during removal of the die lip. On the other hand, if the frame is too warm and plastic, it would tend to sag or otherwise become distorted after its removal from the mold. These and other manufacturers have therefore attempted to provide a flexible independent die lip for use in the same way, but have experienced problems with the expense of such processes, and have found that polishing thereafter with the flexible die lip removed, provides an unsatisfactory product, since the polishing agents used in the finishing process tend to collect in the formed groove to the extent that the grooves must be routed by hand or machine after the polishing process. Also, certain manufacturers have used hand or machine routing processes to form the groove in the frame at the outset, but have similarly experienced cost problems and other problems after the polishing step has been completed.

Accordingly, it is a primary object of the present invention to provide a process for molding the undercut portion of an article, so as to produce a product which is capable of being polished without the necessity of an additional cleaning or routing step after the polishing to eliminate any undesired build-up of polishing materials in the undercut portion as a result of the polishing procedure.

A more specific object is to provide a process for molding an undercut or groove for the inward portions of eyeglass frames and to thereby produce a product, which comprises an unpolished or polished eyeglass frame and means for preventing the undesired build-up of polishing materials in said undercut or inwardly facing groove during the polishing step of the process.

These and other objects are accomplished in one embodiment of the invention which features a process for forming an article comprising the steps of molding an undercut in the inward portion of eyeglass frames around a flexible separate die lip, removing the molded article, with the die lip being carried by the molded article, from the molding apparatus, polishing said article, and thereafter removing the flexible die lip from the eyeglass frame. Also, a novel product is formed after the penultimate step of the aforementioned process which comprises a molded eyeglass frame having an undercut portion inward of its rim, and a flexible die lip integrally associated therewith for preventing the undesired build-up of material within said undercut portion during the polishing step or during any following handling. The said product is suitable for sale by the frame manufacturers to various customers such as the lens manufacturer or others who assemble lenses into frames for sale to the ultimate consumer. In fact, the transfer of such a product to assembling subsidiaries is now the custom of the assignee of the present invention, who also sometimes itself performs the lens-to-frame assembly.

Other objects, features, and modifications of the present invention are contemplated and will become apparent from the following detailed description of the present invention and accompanying drawings in which.

Figure 1:
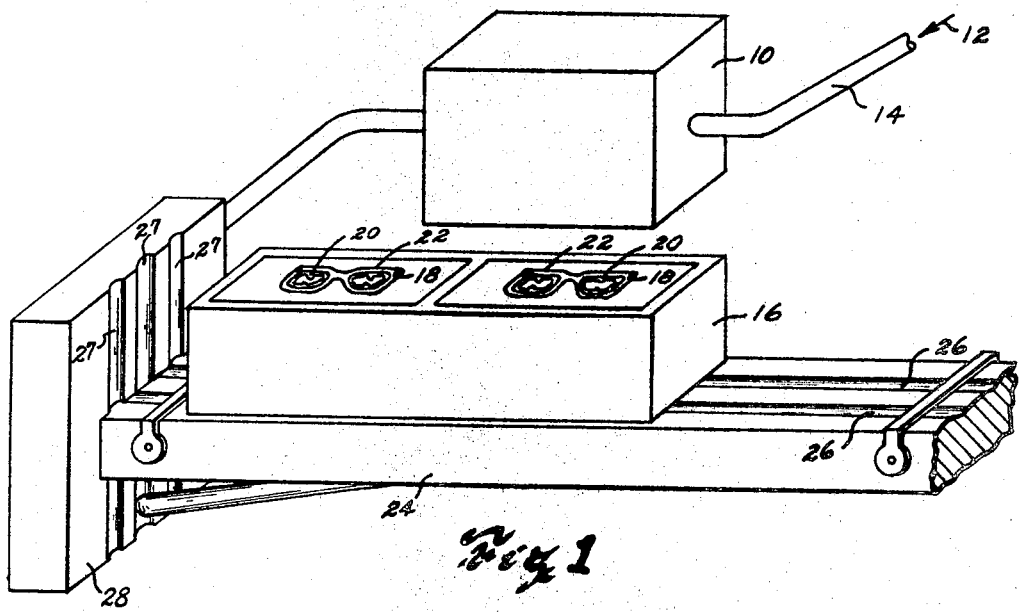
FIG. 1 is an isometric pictorial representation of the apparatus useful in accomplishing the initial steps of the process according to the present invention.
Figures 2, 3:
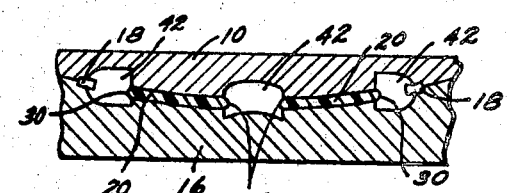
FIG. 2 is a representation of the flexible or stiffly resilient die lip useful in the process and product according to the present invention.
FIG. 3 is a partial cross-section of the molding apparatus of FIG. 1 in closed position.

Referring first to FIG. 1, there is shown a molding apparatus useful in practicing the process and producing the product according to the present invention. The apparatus is shown as comprising a first mold cavity block 10 into which the molding material is poured in direction 12 through tube 14, and a second mold cavity block 16 onto which hinges 18 are inserted along with flexible die lips 20, both of which cavity blocks comprise cavities 22 for molding the proper frame shape. Cavity 22 in the upper (or first) mold block is not shown in FIG. 1, but, as indicated in FIG. 3, it is one-half of a mating pair to the cavities 22 of the lower mold block 16. The apparatus also may comprise a horizontal slide 24 having grooves 26 along which the second cavity block member is conveyed, and a grooved vertical member 28 having formed therein grooves 27 for facilitating the raising and lowering of the horizontal member 24 so that the mold block cavities may be brought into face-to-face registry. It may be seen that the apparatus according to FIG. 1 is operated by loading the second cavity block member with hinges and die lips as each of its halves is withdrawn from under the first cavity block member, with the hinges 18 and the flexible die lips 20 being placed in the receiving indentations of the cavity in the second molding block member. When the mold for the other half of the second cavity block member has been completed, the first-mentioned half of that lower cavity block may then be conveyed to a position directly under the first cavity block member 10 and the horizontal support 24 raised along the grooves 27 in the vertical member, thereby closing the mold, so that when liquid molding material is injected into the mold, it is retained therein. Suitable heating and cooling means, such as steam pipes and cold water pipes (not shown) are incorporated into the cavity blocks, so that when the liquid molding material is injected into the mold, it will readily flow to entirely fill the mold cavity and thereafter be cooled to solidify or set. In some cases thermo-setting molding materials may be used, which require the application of controlled amounts of heat to initiate or complete the solidification of the cure, while subsequent cooling removes heat generated in an exothermic cure and/or cools the molded article, so it may be removed without distortion.

The flexible die lip 20 for use in the molding process described with reference to FIG. 1 is shown in an enlarged view in FIG. 2 as comprising a rim portion 30 for forming the undercut portion of the rim of a typical eyeglass frame, and removal-facilitating members 32 and 34 with tool insertion holes 36 and 38 therein. Holes 36 and 38 are also used to locate the die lip in the mold.

When the moldnig material has been inserted in the apparatus of FIG. 1 and the molding blocks 10 and 16 are in molding relationship, a section view of the molding blocks, frame cavities, flexible die lips, and hinges is as shown in FIG. 3. It is clearly seen in that figure that the flexible die lips 20 have their rim portions 30 protruding slightly into the cavities 42 for the rims of the eyeglass frames to be formed from the mold. It may also be seen that the mold block faces grip the faces of the die lip to hold the die lip in position during the molding. Hinges 18 also protrude slightly into the rim cavities, so as to be in position for mating of the temple members of a typical eyeglass frame.

Figure 4:
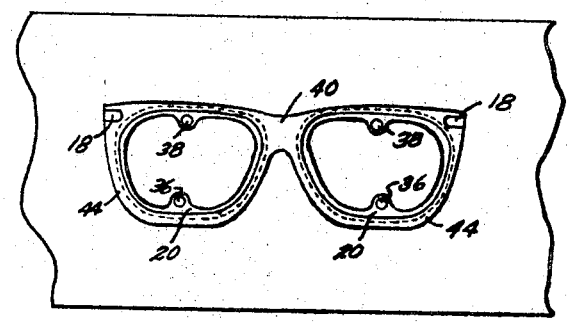
FIG. 4 is a top view representation of the lower molding block of FIG. 1 after the molding step of the process has been completed with the article therewithin formed shown also.
Figure 5:
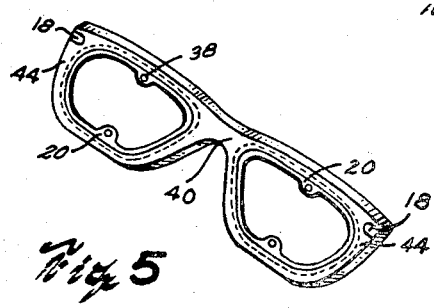
FIG. 5 is an isometric pictorial representation of the product formed after molding and polishing or before polishing.

When the horizontal member 24 is lowered after the molding step of the process has been completed, a top view of the second mold cavity block 16 would be as shown in FIG. 4 with the eyeglass frame 40 formed to comprise rim portions 44, embedded hinges 18 and the flexible die lips 20. Such a product is shown in pictorial isometric view in FIG. 5, and that figure shows clearly a product according to the present invention, which may then be shipped to an intermediate consumer for polishing and lens and temple assembly.

Figure 6:
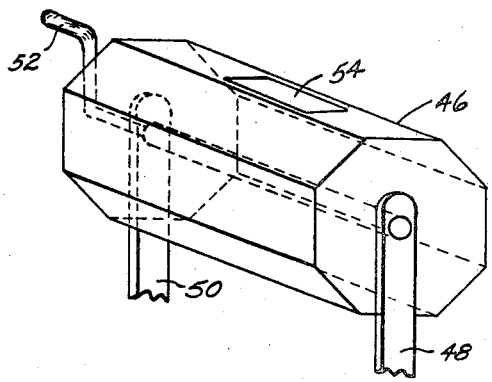
FIG. 6 is a pictorial isometric representation of a polishing drum useful in polishing the article of FIG. 4 and which accomplishes the polishing step of the process according to the present invention.

The eyeglass frame 40 still carrying the inserted flexible die lips is then ready for the polishing step of the process, which may be performed in apparatus such as that shown in FIG. 6. That figure depicts a drum 46, rotatably supported on members 48 and 50 with means such as handle 52 for rotating the drum.. The polishing apparatus of FIG. 6 is operated by placing the frames according to FIG. 5 through a suitable port 54 in the drum 46 and adding thereafter appropriate abrasives, such as liquid abrasives, powder abrasives, and/or abrasive particles, including cork, wood chips, steel balls, etc., in which the eyeglass frames are tumbled in order to polish them properly. Such abrasives tend to tumble through the lens openings of the frames and around the rim portions, with the open-center flexible die lips such as that shown in FIG. 2, facilitating such tumbling.

Figure 7:
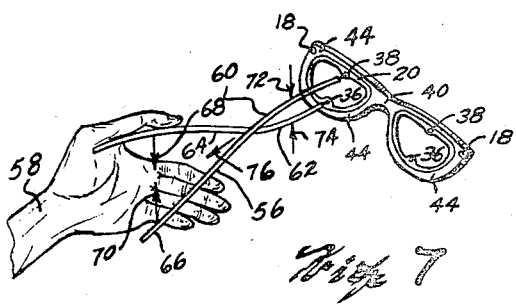
FIG. 7 is a pictorial isometric representation of the step of the process which comprises removing the flexible die lip from the product after the polishing step of the process.

The eyeglass frames are then removed as an alternative product and are suitable for assembly with temple members and lenses by either the operator of the process as described herein or an intermediate consumer, who wishes to perform a number of the subsequent operations. To assemble the eyeglass frames with lenses after the polishing step of the process, the flexible die lips are removed by a tool 56 such as that shown in FIG. 7. The operator 58 inserts the tips of members 60 and 62 into the tool-receiving holes 36 and 38 of the flexible die lip and forces the tool handles 64 and 66 in directions 68 and 70 respectively, to thereby force members 60 and 62 in directions 72 and 74 respectively. In this way, the flexible die lip is forced away from the rim portions 44 of the eyeglass frame 40. The tool is then withdrawn in direction 76, thereby removing the flexible die lip 20 completely.

Figure 8:
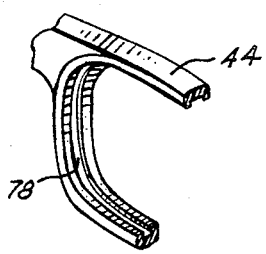
FIG. 8 is a partial view in isometric representation of the article after the removal of the flexible die lip therefrom.

With the die lip removed, a portion of the finished frame 44 is as shown in FIG. 8 with undercut portion 78 therein in lens-receiving condition. There is no need for a polishing operation for the undercuts, since a generally smooth, somewhat polished surface is formed by contact with and molding by the die lip.

Figure 9:
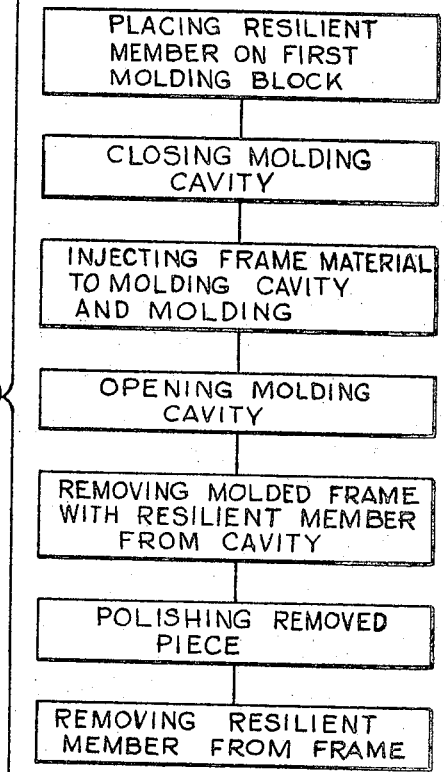
FIG. 9 is a flow chart of a process according to the present invention.

Therefore, the process has been described as comprising the steps, as shown in FIG. 9 of placing a stiffly resilient and/or flexible member, such as the die lip of FIG. 2, on the second molding block; closing the molding cavity by mating first and second mold cavity blocks; injecting frame or molding material to the molding cavity and molding; opening the molding cavity; removing the molded frame with the resilient member integrally associated therewith from the cavity; polishing the removed piece; and, removing the resilient member from the frame. It may be seen that certain of the process steps as described herein and shown in FIG. 9 may be eliminated. For instance, the product may be obtained and bought, sold, or otherwise transferred either before the penultimate step, before the ultimate step, or after the ultimate step, depending upon who will be doing the final frame assembling and polishing. Furthermore, it is contemplated that details of the apparatus of FIG. 1 may differ widely from that shown, with the process performed therein still within the scope of the present invention.

What I claim is:

1. A process for forming an undercut in a molded article comprising the steps of:
   placing a flexible die lip on one of a plurality of mating molding blocks in its article forming cavity;
   mating said molding blocks to form a molding cavity;
   introducing molding material to said cavity;
   molding the article;
   opening the molding cavity;
   removing the molded article with said flexible die lip attached thereto;

polishing said article; and, thereafter removing the die lip from the article intact.

2. A process for forming an undercut in a molded article comprising the steps of:

placing a flexible die lip on one of two mating molding blocks in its article forming cavity;

mating said two mold blocks to form a molding cavity;

injecting molding material to said cavity;

molding the article;

opening the molding cavity by separating the molding blocks;

removing the molded article;

polishing said article; and, thereafter removing the die lip from the article intact.

References Cited

UNITED STATES PATENTS

| 2,607,446 | 8/1952 | Rosan | 264—318 |
| 2,958,904 | 11/1960 | Morin. | |
| 3,104,425 | 9/1963 | Crane | 264—318 |

FOREIGN PATENTS 129,803  1960  U.S.S.R.

OTHER REFERENCES

Burkart, Silman and Draper, Polishing, Robert Draper Ltd., London, England, 1960, pp. 176 and 193 relied on.

ROBERT F. WHITE, *Primary Examiner.*

R. R. KUCIA, *Assistant Examiner.*